United States Patent
Saitou et al.

(10) Patent No.: US 7,146,450 B2
(45) Date of Patent: *Dec. 5, 2006

(54) CONTROL AND SUPERVISORY SIGNAL TRANSMISSION SYSTEM FOR CHANGING A DUTY FACTOR OF A CONTROL SIGNAL

(75) Inventors: Yoshitane Saitou, Nagaokakyo (JP); Kenji Nishikido, Nagaokakyo (JP); Kouji Yukawa, Nagaokakyo (JP); Yasushi Mori, Nagaokakyo (JP)

(73) Assignee: Anywire Corporation (JP)

( * ) Notice: Subject to any disclaimer, the term of this patent is extended or adjusted under 35 U.S.C. 154(b) by 775 days.

This patent is subject to a terminal disclaimer.

(21) Appl. No.: 10/322,573

(22) Filed: Dec. 16, 2002

(65) Prior Publication Data

US 2003/0123590 A1 Jul. 3, 2003

(30) Foreign Application Priority Data

Dec. 28, 2001 (JP) ............................... 2001-400602

(51) Int. Cl.
*G06F 1/00* (2006.01)

(52) U.S. Cl. .................... 710/306; 710/106; 710/110

(58) Field of Classification Search ........ 710/105–106, 710/305–309, 110, 313, 58, 6, 61; 707/208–209, 707/233; 375/354
See application file for complete search history.

(56) References Cited

U.S. PATENT DOCUMENTS

| 3,870,828 | A | * | 3/1975 | Saliga | ......................... 370/527 |
| 5,223,826 | A | * | 6/1993 | Amou et al. | .................. 340/3.2 |
| 5,247,292 | A | * | 9/1993 | Nakanishi et al. | ........ 340/10.34 |
| 5,566,343 | A | * | 10/1996 | Nishiguchi | ................... 710/106 |
| 5,838,249 | A | * | 11/1998 | Saito et al. | ................. 340/3.55 |
| 6,310,708 | B1 | * | 10/2001 | Ota et al. | .................... 398/183 |

FOREIGN PATENT DOCUMENTS

| JP | 64-72623 | 3/1989 |
| JP | 64-89839 | 4/1989 |
| JP | 3-6997 | 1/1991 |

* cited by examiner

*Primary Examiner*—Mark H. Rinehart
*Assistant Examiner*—Raymond N Phan
(74) *Attorney, Agent, or Firm*—McGlew & Tuttle, PC

(57) ABSTRACT

A parent station output section changes a duty factor between a period in which a control data signal is at a level (high-potential low-level) lower than a power supply voltage Vx but higher than high-level signal in other circuit portions and a subsequent period in which the control data signal is at the power supply voltage Vx level to convert the control data signal into a serial pulse voltage signal and output the voltage signal onto data signal lines D+ and D− in accordance with each data value in the control data signal inputted from a controller in each cycle of a clock.

11 Claims, 12 Drawing Sheets

CONTROL AND SUPERVISORY SIGNAL TRANSMISSION SYSTEM FOR CHANGING A DUTY FACTOR OF A CONTROL SIGNAL

BACKGROUND OF THE INVENTION

1. Field of the Invention

This invention relates to a control and supervisory signal transmission system, and in particular to a control and supervisory signal transmission system in which a parallel control signal from a controller is converted into a serial signal, the serial signal is transmitted to a remote device and serial-parallel converted in a controlled device side to drive the device, a supervisory signal from a sensor section for detecting the status of the device is serial-parallel converted and provided to the controller, and the control signal is superimposed on a clock signal on which power-supply signal is superimposed, and in addition, the supervisory signal is superimposed on these signals.

2. Description of the Related Art

In the field of automatic control, a technology is widely used in which control signals are transmitted from a controller such as a sequence controller, a programmable controller, or a computer, to a large number of remote controlled devices (for example, motors, solenoids, solenoid valves, relays, thyristors, or the like) for driving and controlling them and supervisory signals are transmitted from sensors that detect states of devices (on/off state of reed switches, micro-switches, push-button switches) to the controller.

There are problems associated with the above-described technology: because a number of lines, including power lines, control-signal lines, and ground lines, are used to connect a controller with controlled devices and the controller with sensors, wiring becomes increasingly difficult to provide in high-density component layouts and wiring space is reduced and becomes costly in concert with the miniaturization of today's controlled devices.

There have been proposed two approaches: "Method for signal serial-parallel conversion" (Japanese Patent Application Serial No. Sho62(1987)–229978) and "Serial transmission system for parallel sensor signals" (Japanese Patent Application Serial No. Sho62(1987)-247245): According to the approaches, one (1-bit) control signal (or a sensor signal) can be superimposed on each clock on a clock signal line which includes power supply, thereby allowing implementation of a transmission system in which wiring between a controller and controlled devices and between the controller and sensors is reduced.

According to another approach, "Control and supervisory signal transmission method" (Japanese Patent Application Serial No. Hei1(1989)-140826), input units and output units are connected to a parent station and the parent station outputs a clock signal which is superimposed on a power supply signal onto a common data signal line, thereby implementing high-speed bi-directional signal transmission between a controller and controlled devices and the controller and sensors in a simple configuration. That is, a transmission system can be configured with a smaller number of lines, the costs of wiring can be reduced, the connection arrangement of the units can be simplified, and addresses can be assigned to the units flexibly and therefore a unit can be deleted or added to any position.

According to the prior-art arrangements described above, high-speed bi-directional signal transmission can be provided between a controller and controlled devices and between the controller and sensors. However, a signal provided from the controller to a controlled device (hereinafter called a control signal) and a signal provided from a sensor to the controller (hereinafter called a supervisory signal) are outputted onto a common data signal line. Accordingly, both of the signals cannot simultaneously be transmitted. That is, a control signal and a supervisory signal cannot be transmitted at the same time. Instead, they can be transmitted mutually exclusively. Therefore, a time period during which the control signal is transmitted and a separate time period during which the supervisory signal is transmitted must be provided for the common data signal line.

Furthermore, although power supply is superimposed on a clock signal transmitted over a common data signal line, the line transmits for the most part the clock. Accordingly, average power that can be transmitted over the common data line is limited. If transmittable average power could be increased as much as possible, two (24V and 0V) power supply lines would be able to be eliminated and the length of two (D+ and D−) common data signal lines would be able to be increased, thereby allowing a control signal to be transmitted to and a supervisory signal to be obtained from a place in a controlled device where available wiring space is small.

SUMMARY OF THE INVENTION

An object of the present invention is to provide a control and supervisory signal transmission system that superimposes first and second control signals composed of a binary signal having a predetermined duty factor and a voltage signal on a clock signal on which power supply that can transmit large average power is superimposed, and superimposes a supervisory signal composed of a current signal on the clock signal.

A control and supervisory signal transmission system according to the present system comprises a controller and a plurality of controlled devices, each of which includes a controlled section and a sensor section for monitoring the controlled section. The system transmits a control signal provided from a controller to controlled sections in the plurality of controlled devices over a common data signal line and also transmits a supervisory signal from sensors to the controller. It further comprises a parent station connected to the controller and the data signal line and a plurality of child stations associated with the plurality of controlled devices and connected to the data signal lines and the associated controlled devices.

The control and supervisory signal transmission system according to the present invention further comprises in parent station timing generating means for generating a predetermined timing signal in synchronization with a clock of a predetermined cycle, a parent station output section, and a parent station input section. The parent station output section changes the duty factor between a period in which a control data signal provided from the controller is at a level lower than a power-supply-voltage level but higher than high-level signals in the other part of the circuit (a "high-potential low-level" period) and the subsequent period in which the control data signal is at the power-supply-voltage level in accordance with each data value in the control data signal in each clock cycle under the control of the timing signal to convert the control data signal into a serial pulse voltage signal and provides it onto the data signal line. The parent station input section detects a supervisory data signal superimposed on a serial pulse voltage signal transmitted through the data signal line in each clock cycle under the control of the timing signal to extract a data value from the serial supervisory signal, and converts the extracted data value into a supervisory signal and inputs it to the controller. Each of the plurality of child stations has a child station output section and a child station input section. The child station output section identifies the duty factor between a period in which a serial pulse voltage signal is not at the power-supply-voltage level (a "high-potential low-level") and the subsequent period in which the signal is at the power-supply-voltage level in each clock cycle under the control of the timing signal to extract each data value from the control data signal and provides a data value among the data values that is relevant to the child station to its associated controlled section. The child station input section generates a supervisory data signal according to the value of a sensor associated with it under the control of the timing signal and superimposes it on a predetermined position of a serial pulse voltage signal as the supervisory signal data value.

According to the control and supervisory signal transmission system of the present invention, the control signal provided from the controller to the controlled sections is a binary (a supply-voltage level and a "high-potential low-level") signal of the predetermined duty ration and a supervisory signal provided from sensors to the controller is detected as the presence or absence of a current signal. This allows a clock signal to be superimposed on the control signal and supervisory signal and the need for power lines to be eliminated. As a result, high-speed bi-directional signal transmission between the controller and the controlled sections and between the controller and the sensors can be achieved. In addition, the control signal and supervisory signal can be outputted onto a common data line and transmitted bidirectionally and simultaneously. Furthermore, sufficient electric power can be supplied to the child stations without power lines. As a result, the need for providing separate periods for transmitting a control signal and supervisory signal over the common data line can be eliminated and the signal transmission rate can be doubled compared with conventional rates. Furthermore, by increasing an average voltage which can be transmitted, the power lines can be omitted, and a section for only common data line can be prolonged, and the control signal can be transmitted to a small wiring space of the controlled devices to obtain the supervisory signal.

DETAILED DESCRIPTION OF THE PREFERRED EMBODIMENTS

Figure 1:
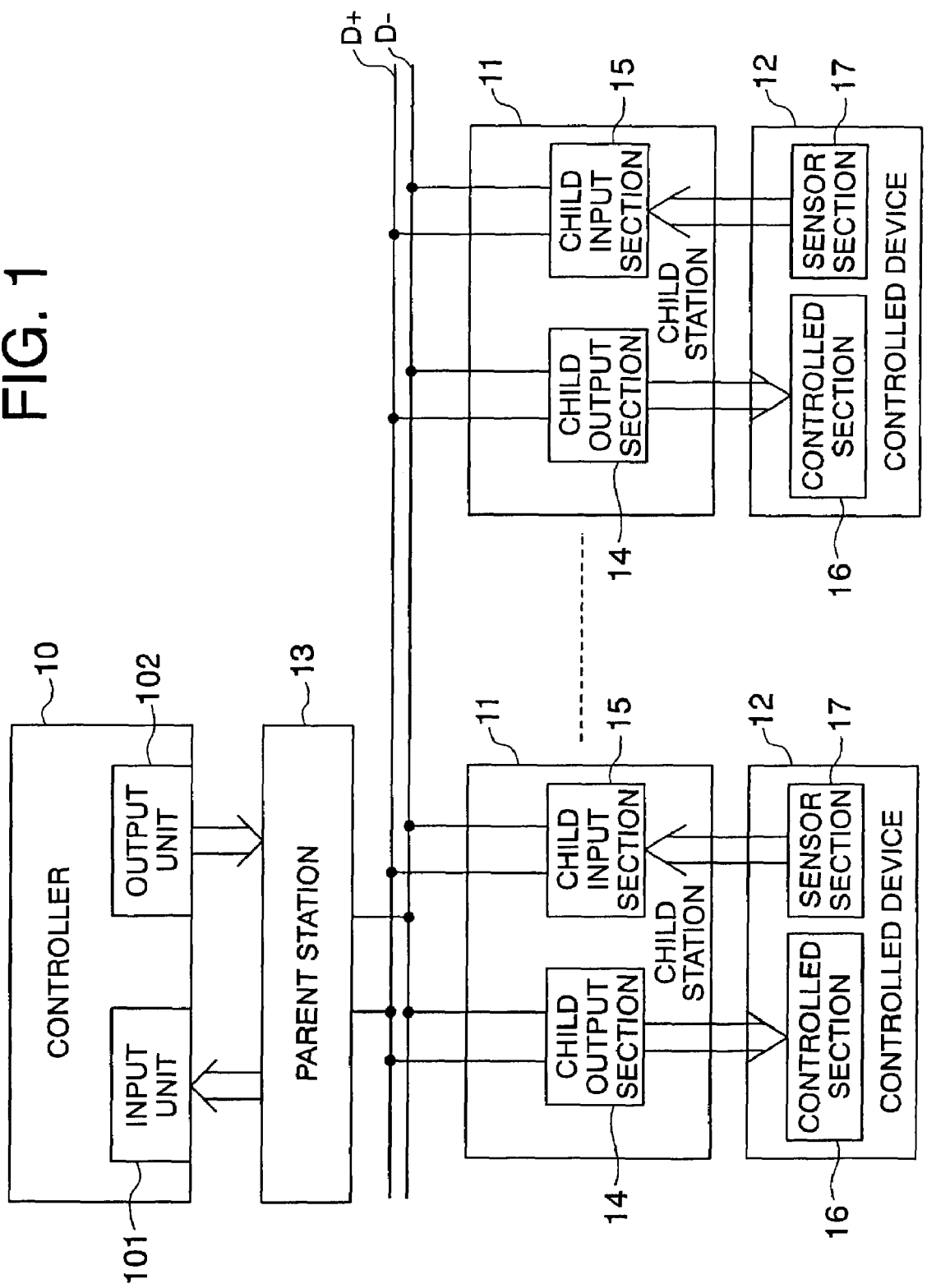
FIG. 1 shows a basic configuration according to the present invention.
Figure 2:
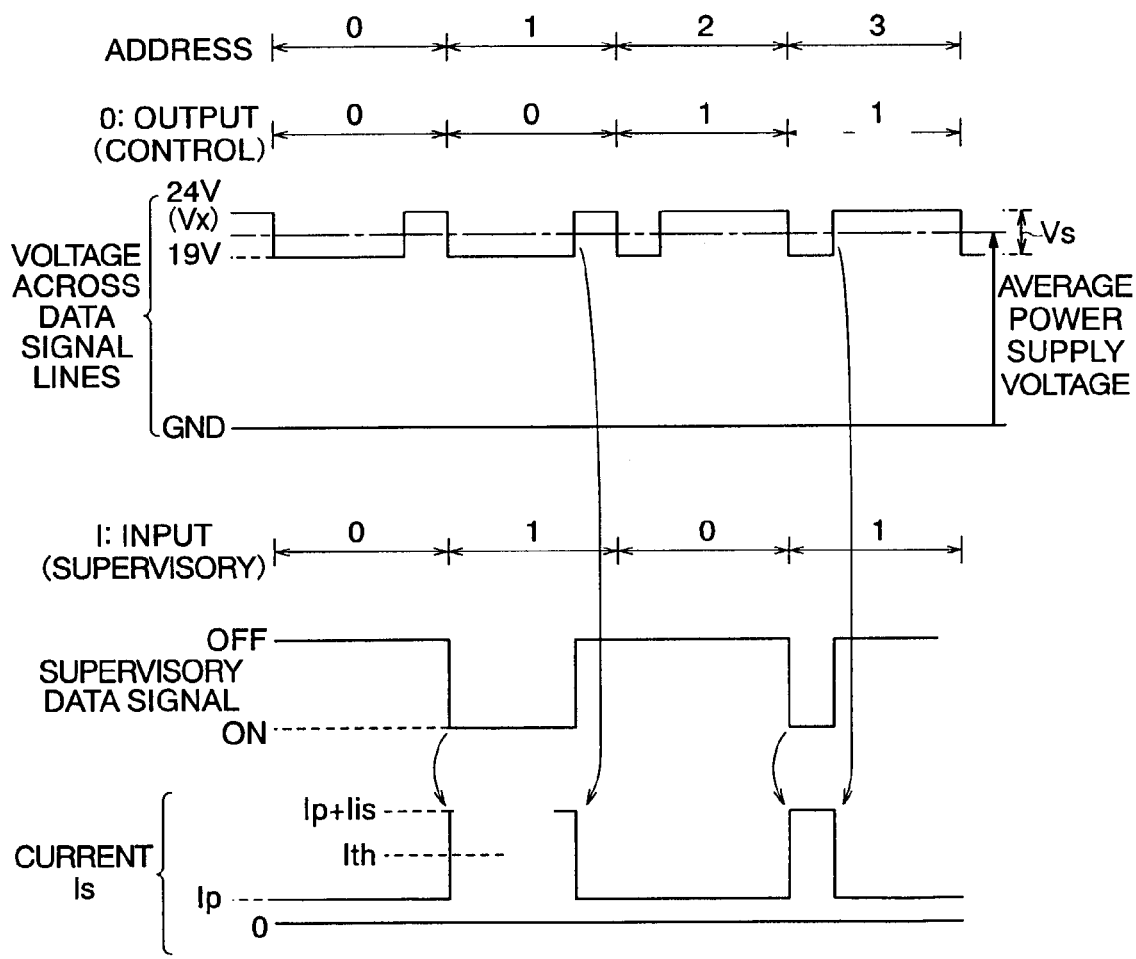
FIG. 2 shows a diagram illustrating signal transmission according to the present invention.
Figure 3:
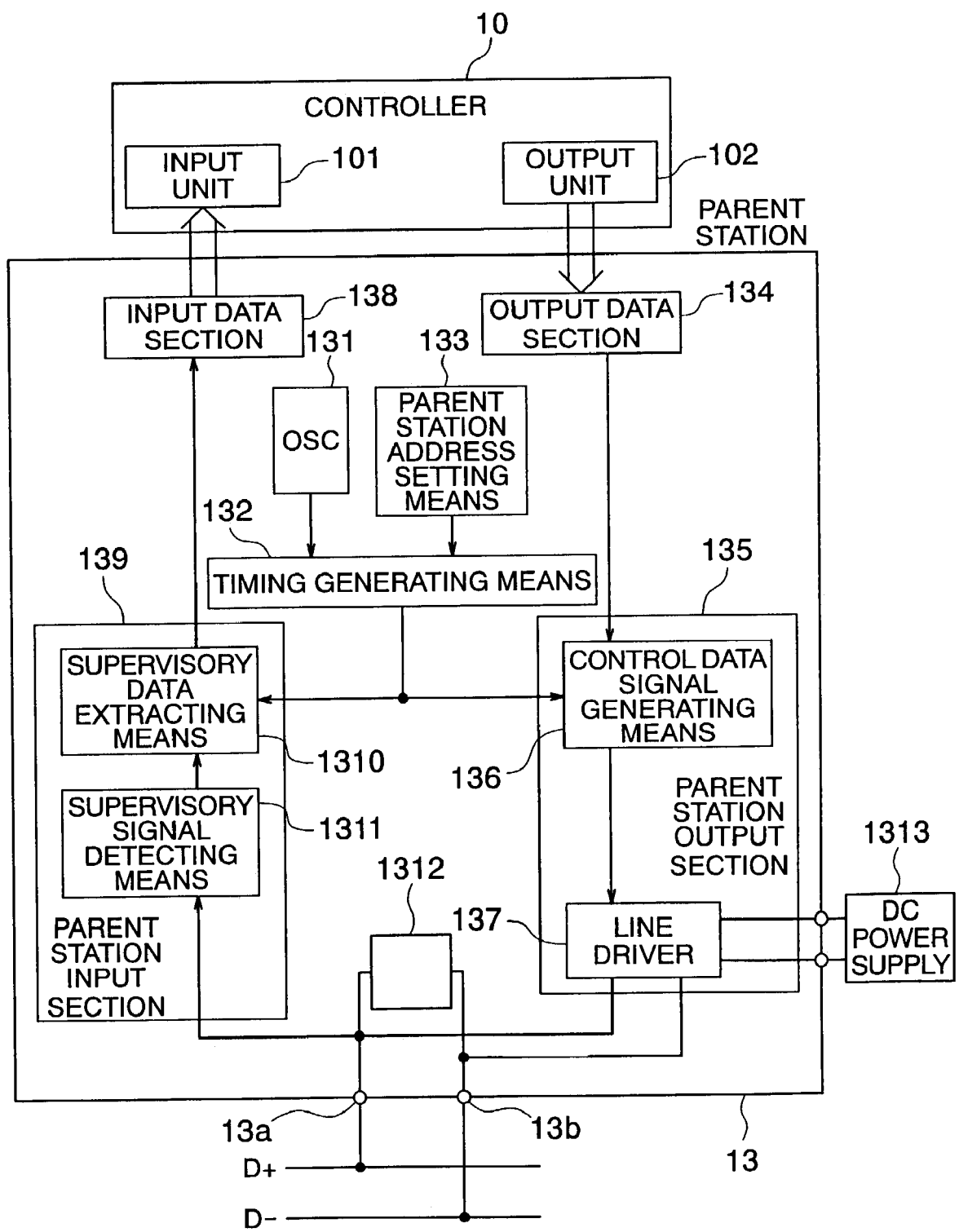
FIG. 3 shows a basic configuration according to the present invention.
Figure 4:
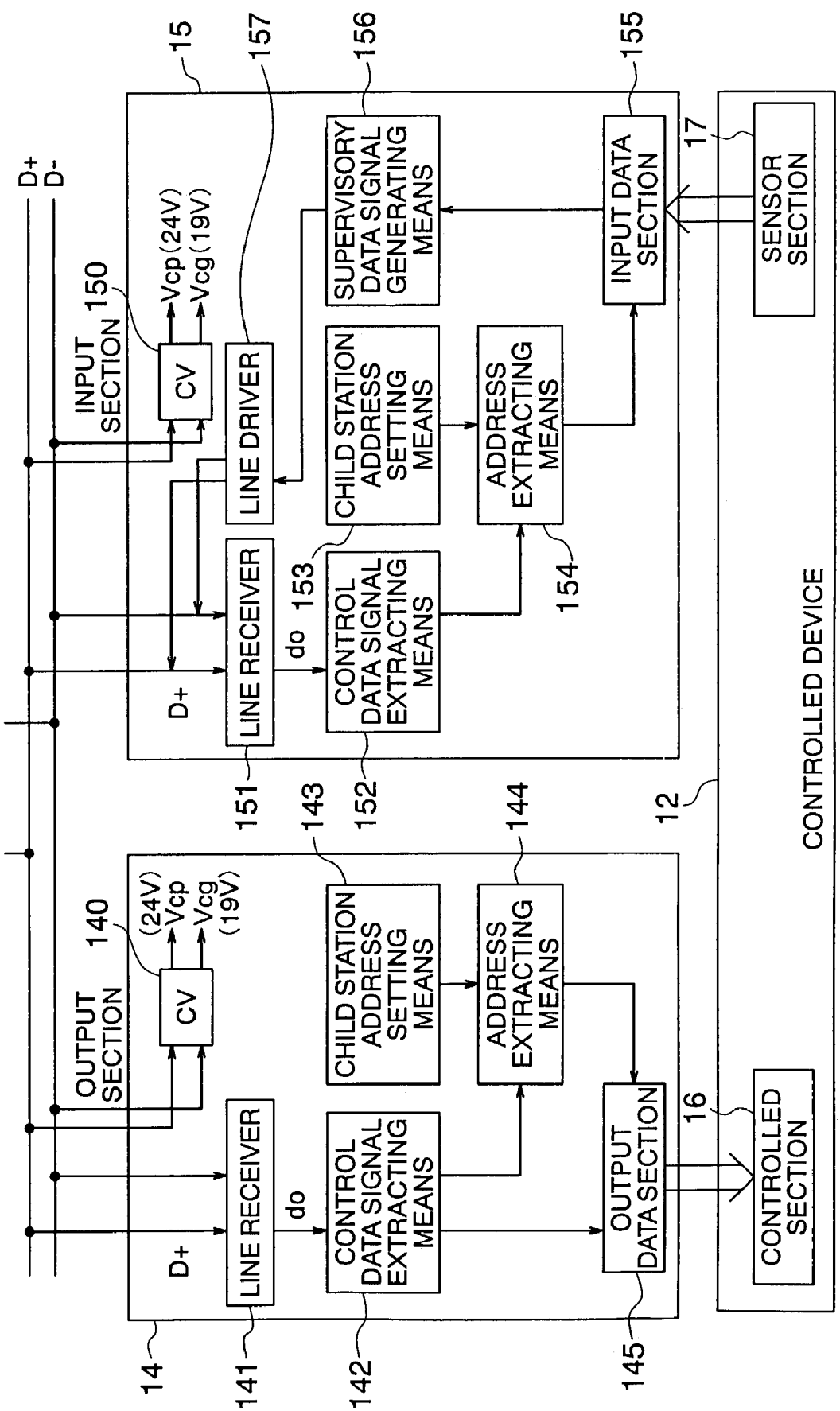
FIG. 4 shows a basic configuration according to the present invention.

FIGS. 1, 3 and 4 show basic configurations according to the present invention. FIG. 2 shows a diagram illustrating signal transmission according to the present invention. In particular, FIG. 1 shows a configuration of a control and supervisory signal transmission system of the present invention, FIG. 3 shows a configuration of a parent station in the system, and FIG. 4 shows a configuration of a child station in the system.

As shown in FIG. 1, the control and supervisory signal transmission system comprises a controller 10 and a plurality of controlled devices 12, each of which includes a controlled section 16 and a sensor section 17 for monitoring the controlled section 16. The controller 10 may be a sequence controller, programmable controller, a computer, or the like. The controlled section 16 and sensor section 17 are referred to as a controlled device 12. The controlled section 16 may be any of the various components that make up the controlled device 12, such as an actuator, (stepping) motor, solenoid, solenoid valve, relay, thyristor, lamp, for example. The sensor section 17 is selected according to its associated controlled section 16. It may be a reed switch, microswitch, or push-button switch, for example, and outputs an on/off state signal (binary signal).

The control and supervisory signal transmission system transmits a control signal from an output unit 102 of the controller 10 to the controlled sections 16 through a data signal line which is shared by the plurality of controlled devices 12, and also transmits a supervisory signal (sensor signal) from the sensor sections 17 to an input unit 101 of the controller 10. As shown in FIG. 1, the control signal and supervisory signal inputted and outputted to and from the controller 10 are multi-bit parallel signals. On the other hand, the control signal and supervisory signal transmitted through the data signal line are serial signals. A parent (main) station 13 performs parallel-serial conversion of control signals and serial-parallel conversion of supervisory signals. The data signal line comprises a first and second data signal lines D+ and D−. The gap between the first data signal line D+ and second data signal line D− is used for supplying a power supply voltage Vx, a clock signal CK, and simultaneous bi-directional transmission of control and supervisory signals, as will be described later.

In this example, power lines P (a 24 Volt power line and a 0 Volt power line) for providing the power-supply voltage Vx to each of the plurality of child stations 11 and a local power supply are not provided. Power is supplied to the plurality of child stations 11 by using a power-supply signal superimposed on a clock signal, as will be described later. The power capacity of this power-supply signal is sufficient for each of the child station 11 to operate well.

To accomplish such signal transmission, the control and supervisory signal transmission system comprises the parent station 13 and the plurality of child stations 11, as shown in FIG. 1. The parent station 13 is connected to the controller 10 and the data signal lines. The plurality of child stations 11 are associated with a plurality of controlled devices 12 and connected onto the data signal line at any positions and to the associated controlled devices 12. Each of the plurality of child stations 11 includes a child station output section 14 and a child station input section 15. The child station output section 14 and child station input section 15 are referred to as a child station 11. The child station output section 14 and child station input section 15 are associated with a controlled section 16 and sensor section 17, respectively. As shown in FIG. 1, control and supervisory signals inputted and outputted to and from the child station input section 15 and child station output section 14 are multi-bit parallel signals. The child station output section 14 performs serial-parallel conversion of control signals and the child station input section 15 performs parallel-serial conversion of supervisory signals.

The parent station 13 includes timing generating means 132, a parent station output section 135, and a parent station input section 139, as shown in FIG. 3. While only one parent station input section 139 and one parent station output section 135 are shown in FIG. 3, a number n (n≧1) of parent station input sections 139 may be provided and a number m (m≧1) of parent station output sections 135 may be provided. A number "m" of child station output sections 14 and a number "n" of child station input sections 15 may be provided accordingly.

The parent station 13 includes an oscillator (OSC) 131, timing generating means 132, and parent station address setting means 133. The timing generating means 132 generates a predetermined timing signal that synchronizes with a clock CK of a predetermined cycle, based on an oscillation output from the oscillator 131. The timing generating means 132 superimposes a power supply voltage Vx on a generated clock CK. For that purpose, the timing generating means 132 includes a power supply section 1313 for generating a power supply voltage Vx at a predetermined, fixed level. For example, a duty factor of 50% may be used to provide a "high-potential low-level" during the first half of one clock CK and provide the power-supply voltage Vx level during the second half of the clock CK. The clock CK including the power supply voltage is subjected to level conversion, then outputted to terminals 13a and 13b and provided to the first data signal line D+ and the second data signal line D− as will be described later. In other words, it is outputted as a relative potential difference between the two data signal lines.

The clock CK including the power supply voltage outputted from the timing generating means 132 is in practice inputted into the parent station output section 135. The parent station output section 135 includes control data signal generating means 136 and a line driver 137. The output data section 134 holds parallel control data signals provided from the controller 10 and converts them into a serial data string to output it. The control data signal generating means 136 superimposes each data value in the serial data string from the output data section 134 on the clock CK including the power supply voltage. The output data section 134, which is drawn separately from the parent station output section 135 in FIG. 3, may be regarded as being included in the parent station output section 135. Output from the control data signal generating means 136 is provided onto the first and second data signal lines D+ and D− through the line driver 137, which is an output circuit.

As shown in FIG. 2, the parent station output section 135 changes the duty factor between a period in which a control data signal provided from the controller 10 is not at the predetermined power-supply voltage Vx level and the subsequent period in which the signal is at the predetermined power-supply voltage Vx level in accordance with the data value in the control signal in each cycle of the clock CK under the control of the timing signal to convert the control data signal into a serial pulse voltage signal and provides it onto the data signal line.

The level different from the power-supply-voltage Vx is lower than the power-supply voltage (in terms of absolute value) and higher than high-level signals in the remaining part of the circuitry (in terms of absolute value). It may be a "high-potential low-level," for example. If Vx=24V, the "high-potential low-level" may be 19V, for example. This is well above the 5V CMOS high-level signal in the remaining part of the circuitry (for example CMOS logic circuit part). The potential difference Vs between the high and low levels of the clock, which is a pulse voltage, is 5V. Therefore, the intermediate value (21.5V, when D− is used as the base level) can be used as a threshold to distinguish the level from the power-supply voltage level. In other words, the potential difference Vs is equal to the CMOS logic amplitude in the remaining part of the circuitry (for example CMOS logic circuit part). Therefore, the serial pulse voltage signal can be considered as a signal produced by level-shifting a clock having duty factor of 50% and potential difference Vs and performing pulse-width modulation on the clock in accordance with the control data signal. If this pulse-width-modulated clock, which is amplitude-limited at a high potential, the average power supply voltage provided by average power transmitted is as high as +21.5V, which is approximately the central value of the amplitude, as indicated by the alternate long and short dashed line in FIG. 2. Accordingly, power sufficient for each of the plurality of child stations 11 to operate can be provided to the child stations without using power lines P as described earlier.

Figure 6:
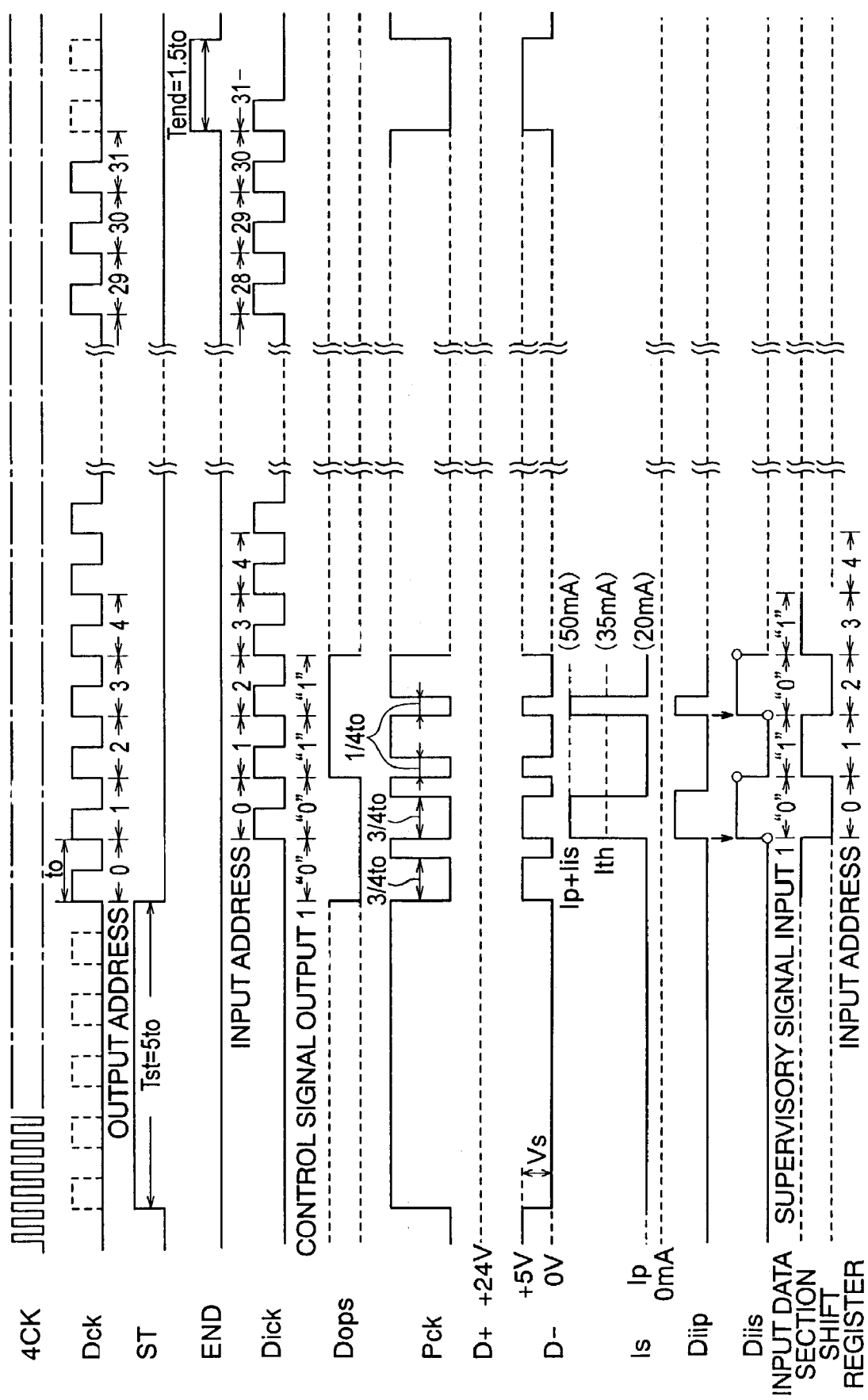
FIG. 6 shows charts of waveforms of signals in the parent station shown in FIG. 5.

To change a serial pulse voltage signal on the data signal line as described above, two methods are available. In a first method, the potential of the first data signal line D+ is varied between power-supply voltage Vx=24V in accordance with the value of the control data signal, which is the highest potential, and 19V, which is the "high-potential low-level," and the potential of the second data signal line D− is kept at a ground level. Alternatively, the potential of the first data line D+ may be varied between 0V and −5V and the potential of the second data line D− may be kept a −24V, which is the lowest potential. In a second method, the potential of the first data signal line D+ is kept at the ground level, which is the highest potential, and the potential of the second data signal line D− is varied between the power-supply voltage Vx=−24V, which is the lowest potential, and −19V, which is the "high-potential low-level (low-level having high absolute value)," in accordance with the value of the control data signal. Alternatively, the potential of the first data signal line D+ may be kept at the highest potential, +24V, and the potential of the second data signal line D− may be varied between +5V and 0V. FIG. 6 shows a waveform according to this example. In any of these methods, a relative difference between the potential of the first and second data lines D+ and D− is as described above.

A power supply voltage of 24V has been used in the prior art as well. However, in the prior art, the amplitudes of amplitude-modulated control signals are 12V and 0V. Accordingly, the average power supply voltage provided by average power carried by a clock of the prior-art is as low as 12V or less. Therefore, if power supply lines P were eliminated in the prior art, not all the child stations 11 would be able to be operated without limiting the number of the child stations 11. Because limiting the number of child stations 11 is impractical, the provision of the power lines P has been unavoidable.

In FIG. 2, when the data value in a control data signal is "0", the parent station output section 135 forces the first ¾ cycles of the clock to the high-potential low-level and the remaining ¼ cycle of the clock to the power-supply voltage Vx level. When the data value in the control data signal is "1", it forces the first ¼ cycle of the clock to the "high-potential low-level" and the remaining ¾ cycles of the clock to the power-supply voltage Vx level. That is, it changes the duty factor of the clock according to the data value in the control data signal. Thus, the parent station output section 135 converts the parallel control data signals into a serial pulse voltage signal and provides it onto the data signal line. For example, if the data value in the control data signal is "0011," the output from the control data signal generating means 136 would be as shown in FIG. 2 (a signal excluding a supervisory signal, which will be described later). An address is assigned to each cycle of the clock CK.

Signals on the first and second data signal lines D+ and D− are taken into the parent station input section 139. The parent station input section 139 includes a transmission line bleeder current circuit 1312, supervisory signal detecting means 1311, and supervisory data extracting means 1310. The supervisory signal detecting means 1311 cooperates with the transmission line bleeder current circuit 1312 to capture current signals on the first and second data signal lines D+ and D−, detects a supervisory data signal (current signal) superimposed there, and outputs it. The supervisory data extracting means 1310 synchronizes this output detected with a clock CK, which is provided from the timing generating means 132 and include the power-supply voltage, and outputs a waveform-shaped signal. The input data section 138 converts a serial data string comprising detected supervisory data signals into parallel supervisory data signals and outputs them. The input data section 138, which is drawn separately in FIG. 3, may be considered as being included in the parent station input section 139.

As shown in FIG. 2, the parent station input section 139 detects a supervisory data signal superimposed on a serial pulse voltage signal on a data signal line as the presence or absence of a current signal Is=(Ip+Iis) in each cycle of the clock CK under the control of a timing signal. It extracts and converts each data value from the serial supervisory signal into the supervisory signal and inputs the resulting signal into the controller 10. Thus, if the data value in the supervisory data signal is "0101", for example, the output (detected current) from the supervisory signal detecting means 1311 will be as shown in FIG. 2. Symbol IP indicates the constant current (20 mA) of the transmission line bleeder current circuit 1312 in FIG. 5, Ith indicates the threshold current (35 mA) of the supervisory signal detecting means 1311 in FIG. 5, and Iis indicates a supervisory data signal (30 mA), which will be described later. Ith is the intermediate value between Is and Ip.

Because control signals to be delivered to a plurality of child stations 11 are transmitted as serial signals (serial pulse voltage signal) from the single parent station 13 through the data signal lines as described above, address counting is used for the delivery. The total number of pieces of data of a control data signal to be sent (delivered) to the child stations 11 can be known beforehand. An address is assigned to each piece of the data of all the control data signals. Each of the child stations 11 extracts clocks CK from the serial pulse voltage signals and counts the clocks. If the child station encounters the single address or the plurality of the addresses assigned to data of control data signal which it should receive, it captures the data value in the serial pulse voltage signal as a control signal. The final address is assigned to the parent station 13 for generating an end signal.

In order to determine the start and end of address counting, start and end signals are generated. Before outputting a serial pulse voltage signal, the parent station 13 generates a start signal and provides it onto the first data signal line D+ by using the timing generation means 132. The start signal is longer than one cycle of the clock signal CK so as to be distinguished from a control signal. The parent station address setting means 133 holds an address assigned by the parent station 13. The parent station 13 counts clocks CK extracted from the serial pulse voltage signal until it extracts the address assigned to it, then outputs the end signal onto the first data signal line D+. The end signal is longer than one cycle of the clock signal CK and shorter than the start signal.

As shown in FIG. 4, the child station output section 14 includes power-supply-voltage generating means (CV) 140, a line receiver 141, control data signal extracting means 142, child station address setting means 143, address extracting means 144, and an output data section 145.

The power-supply-voltage section (CV) 140 generates a power supply voltage at a fixed level from the data signal lines. That is, it smoothes and stabilizes voltages on the first and second data signal lines D+ and D− by using known means to provide stabilized outputs Vcg (19V) and Vcp (24V). When output Vcp (24V) is used as a reference voltage, output Vcg (19V) becomes a 5V power-supply voltage (equivalent to Vcc). The power-supply voltage is used to electrically drive a low-power-consumption circuit (for example an LED display circuit) associated with the child station output section 14 and a controlled section 16 of the associated controlled device 12. That is, power-supply-voltage generating section 140, which is not shown, supplies power to the controlled section 16.

The line receiver 141, which is an input circuit, captures a signal on the first and second data signal lines D+ and D− and provides it to the control data signal extracting means 142. The control data signal extracting means 142 extracts a control data signal from the signal and provides it to the address extracting means 144 and the output data section 145. The child station address setting means 143 holds an address assigned to the child station output section 14. The address extracting means 144 extracts an address that matches the address held in the child station address setting means 143 and provides it to the output data section 145. When the address is inputted from the address extracting means 144, the output data section 145 outputs one or more data values in (serial) signals being transmitted on the first and second data signal lines D+ and D− that is currently held to the associated controlled section 16 as parallel signals. That is, the output data section 145 performs serial-parallel conversion on the control signal.

As shown in FIG. 2, the child station output section 14 identifies the duty factor between a period in which the serial pulse voltage signal is at a level ("high-potential low-level") different from a power-supply voltage level and the subsequent period in which the signal is at the power-supply voltage Vx level in each clock cycle under the control of the timing signal. Thus, it extracts each data value from the control data signal and provides a data value among the data values that is relevant to the child station to its associated controlled section 16. For example, when the first ¾ cycles of the clock CK is at the "high-potential low level", a data value of "0" is extracted as the original control data signal data value. When the ¼ cycle is at the "high-potential low level", "1" is extracted as the original control data signal value. Thus, if the serial pulse voltage signal is as shown in FIG. 2, a control data signal data value, "0011", is extracted. The child station output section 14 provides data relevant to the child station 11 among data values to its associated controlled section 16.

The child station input section 15 includes power-supply-voltage generating means (CV) 150, a line receiver 151, control data signal extracting means 152, child station address setting means 153, address extracting means 154, an input data section 155, supervisory data signal generating means 156, and a line driver 157 as shown in FIG. 4.

As can be seen from FIG. 4, the configuration and operations of the part starting from the power-supply-voltage generating means 150 to the address extracting means 154 is about the same as that of the part starting from power-supply-voltage generating means 140 to the address extracting means 144. Like the power-supply-voltage generating means 140 described above, the power-supply-voltage generating means 150 generates fixed-level power voltages, output Vcg (19V) and output Vcp (24V), for electrically driving the circuits making up the child station input section 15 and a sensor section 17 of the associated controlled device 12, from the first and second data signal lines D+ and D−.

The input data section 155 holds a supervisory signal composed of one or more (bits of) data values provided from its associated sensor section 17. When an address is inputted from the address extracting means 154, the input data section 155 outputs one or more data values which it holds to the supervisory data signal generating means 156 as a serial signal in a predetermined order. That is, the input data section 155 performs parallel-serial conversion on the supervisory signal. The supervisory data signal generating means 156 outputs a supervisory data signal in accordance with the data values in the supervisory signal. The supervisory data signal outputted from the supervisory data signal generating means 156 is provided by the line driver 157, which is an output circuit, onto the first and second data signal lines D+ and D−. Thus, the supervisory data signal is superimposed on data values in control signals that are currently on the first and second data signal lines D+ and D−. That is, the supervisory data signal is superimposed at a position of data in the serial pulse voltage signal that is relevant to the child station 11. In other words, the supervisory signal data value is superimposed on the control signal data value of the same address as that of the supervisory signal data value.

As shown in FIG. 2, the child station input section 15 creates a supervisory data signal comprising a two-valued level different from the power-supply voltage in accordance with a value of the associated sensor section 17 under the control of the timing signal and superimposes it on a predetermined position in the serial pulse voltage signal as a data value of the supervisory signal. For example, if a data value in the supervisory data signal is "1," a supervisory data signal is generated and superimposed at a predetermined position in one cycle of the clock signal CK. If the value is "0," then no supervisory data signal is generated and superimposed. For example, if a data value in the supervisory data signal is "0101," the output (detection current) from the supervisory signal detecting means 1311 that results from the superimposition of the supervisory data signal by the line driver 157 will be as shown in FIG. 2, as described earlier.

Figure 5:
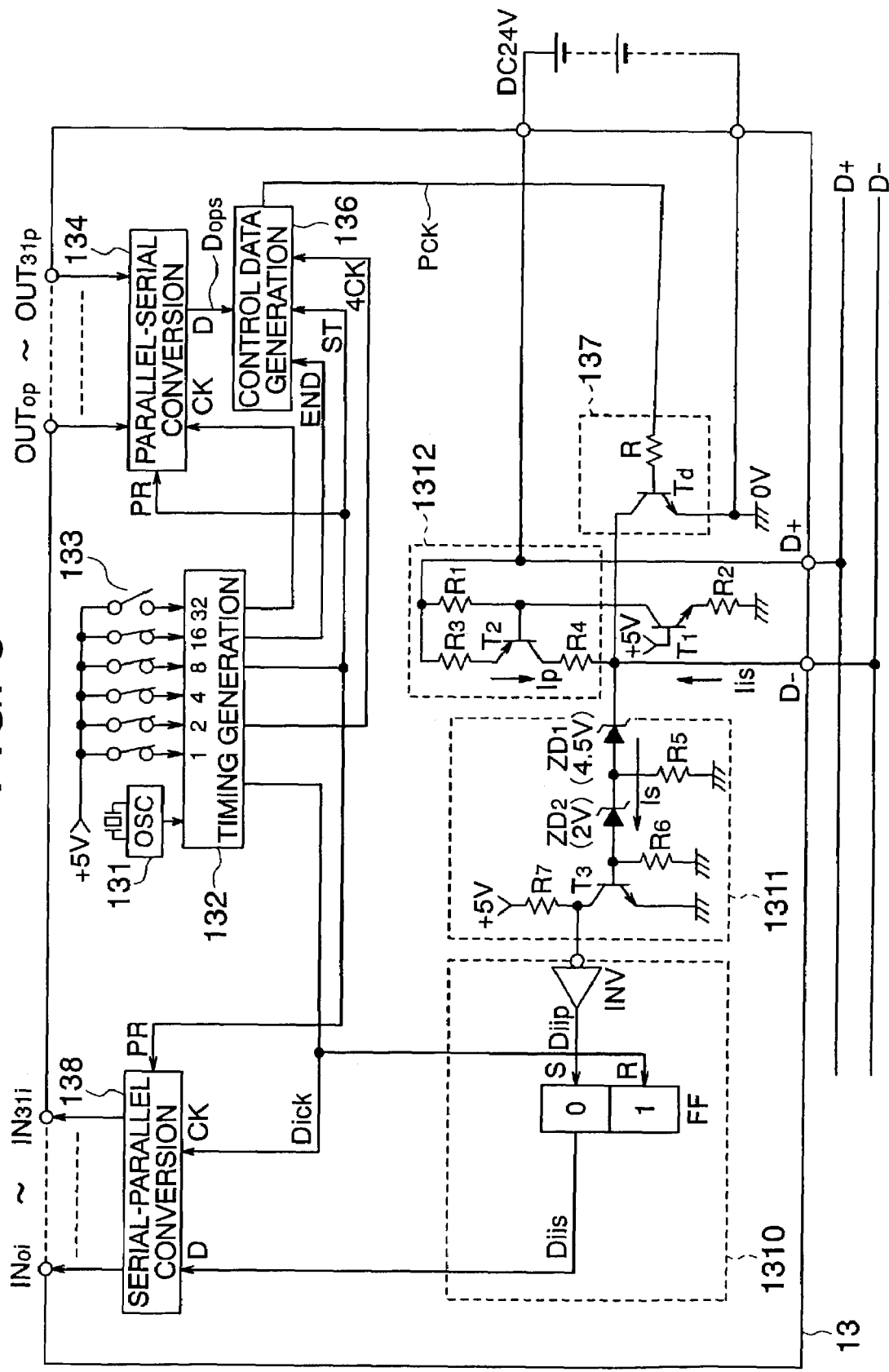
FIG. 5 shows a basic configuration of an exemplary parent station.
Figure 7:
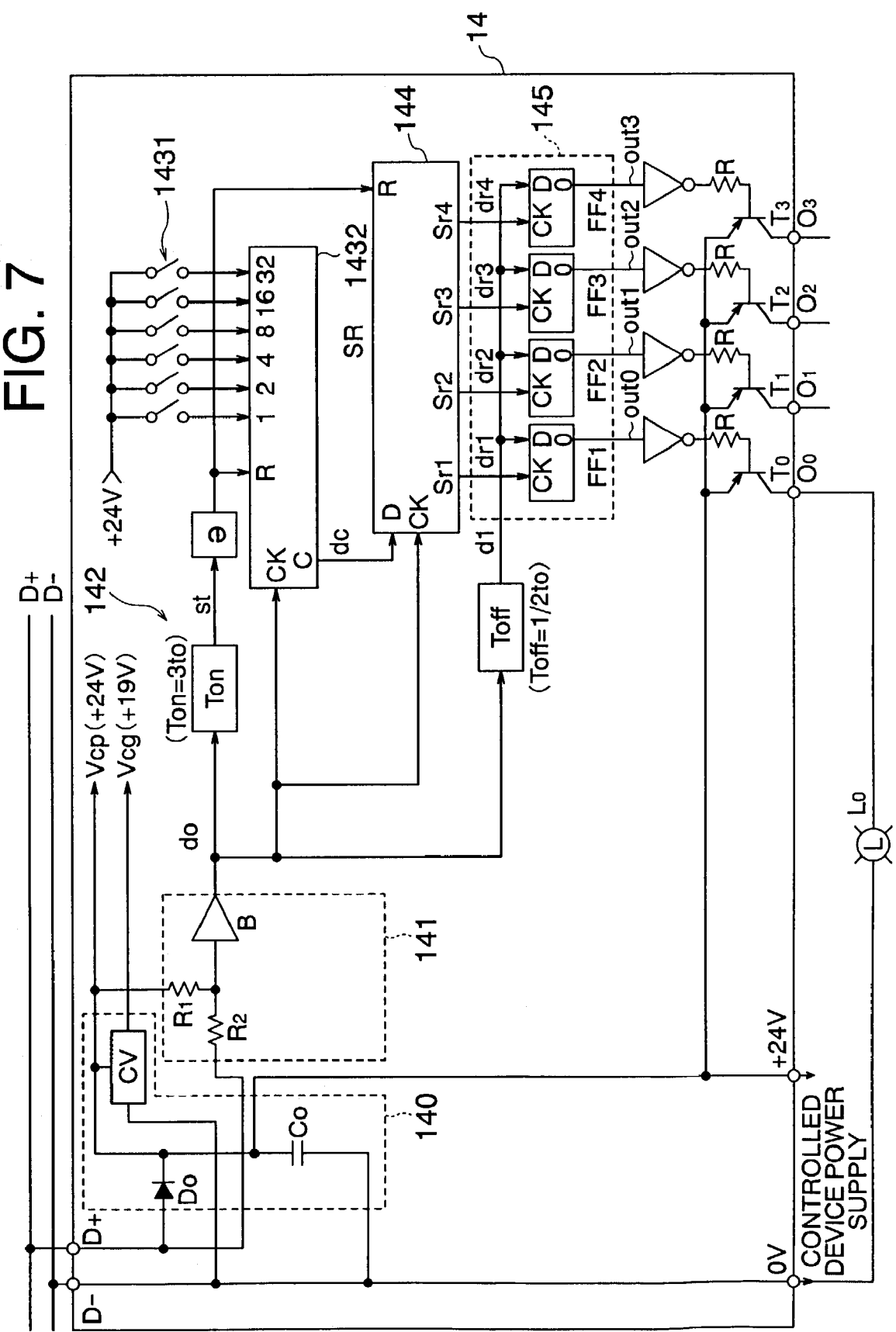
FIG. 7 shows a configuration of an exemplary child station output section.
Figure 8:
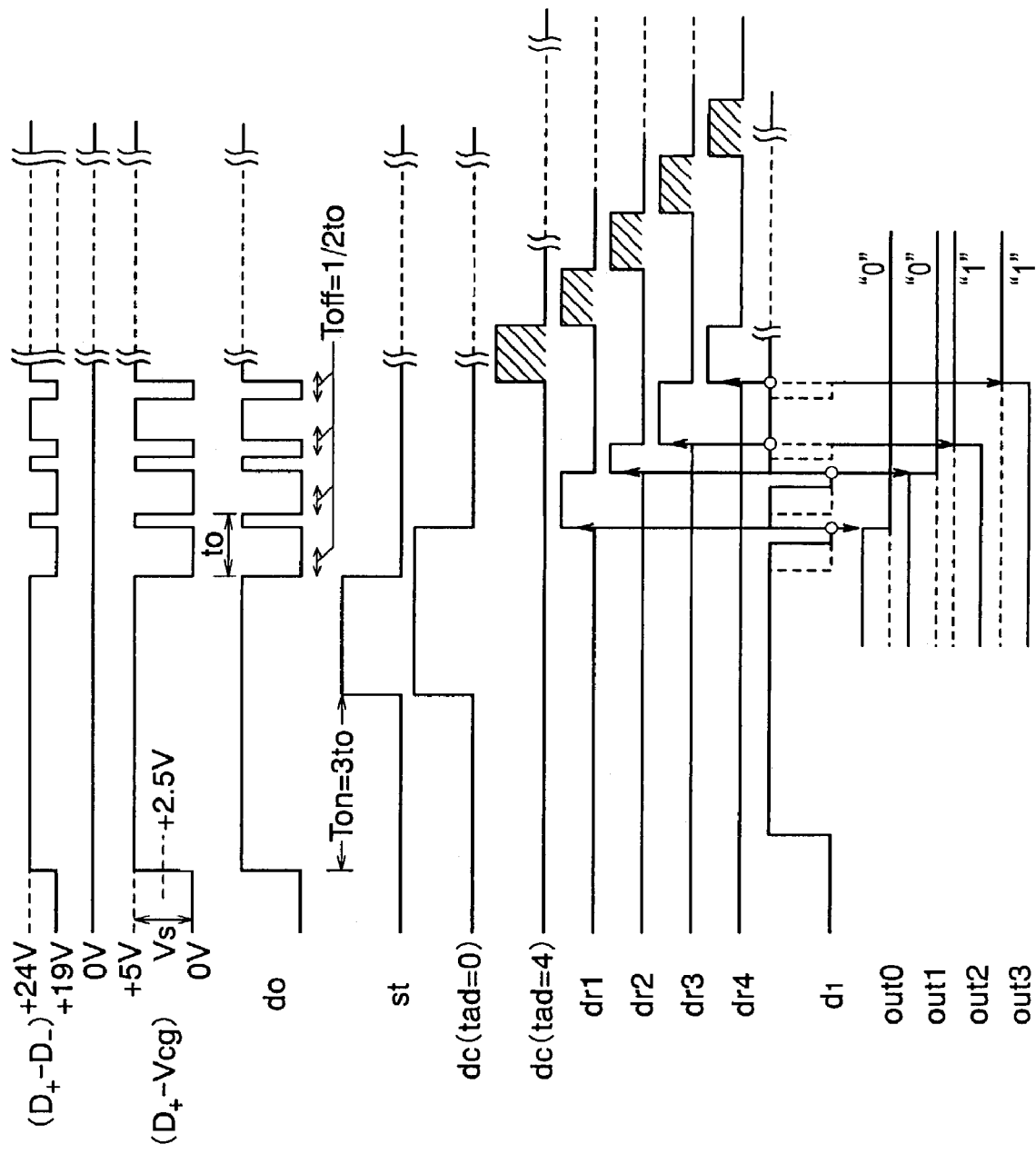
FIG. 8 shows charts of waveform of signals in the child station output section shown in FIG. 7.
Figure 9:
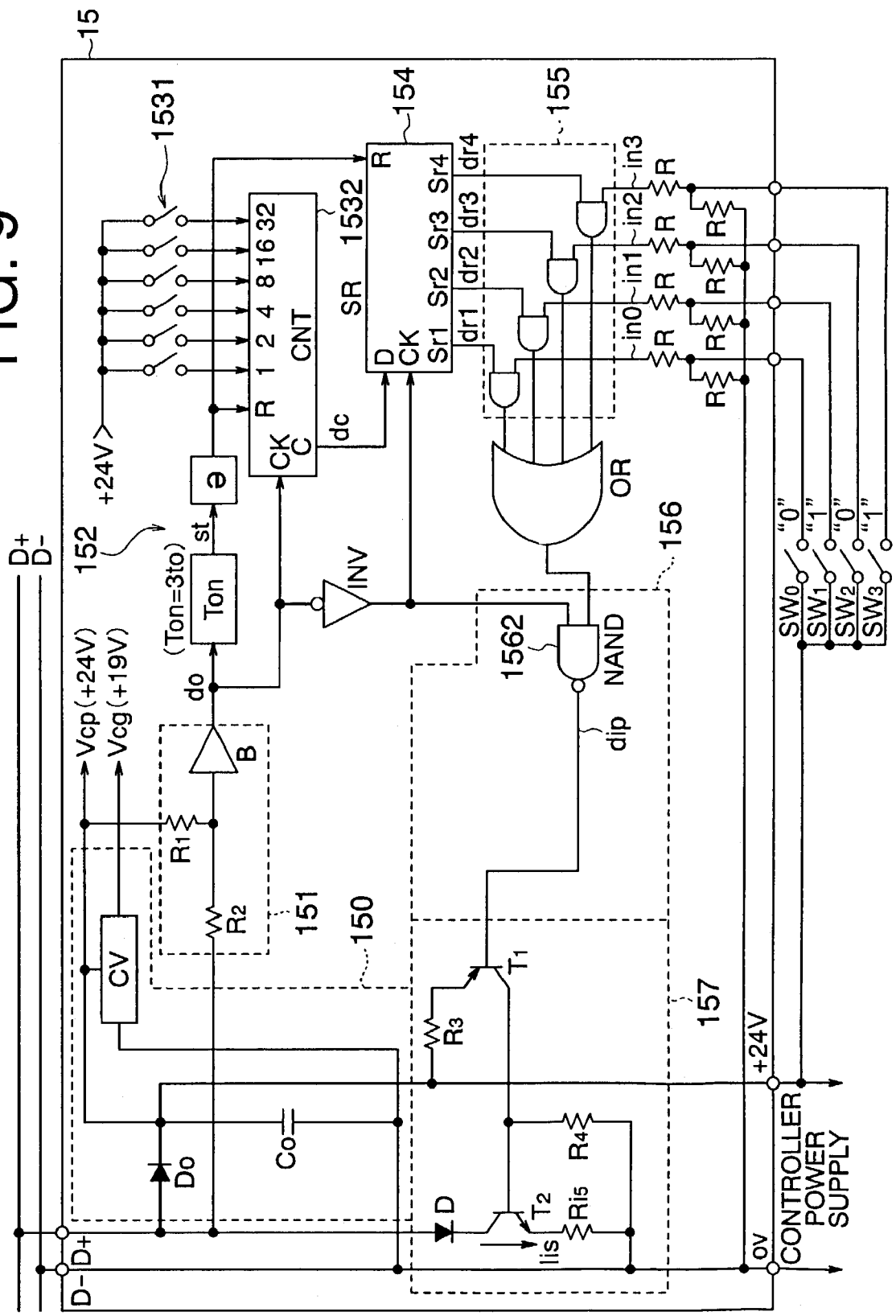
FIG. 9 shows a configuration of an exemplary child station input section.
Figure 10:
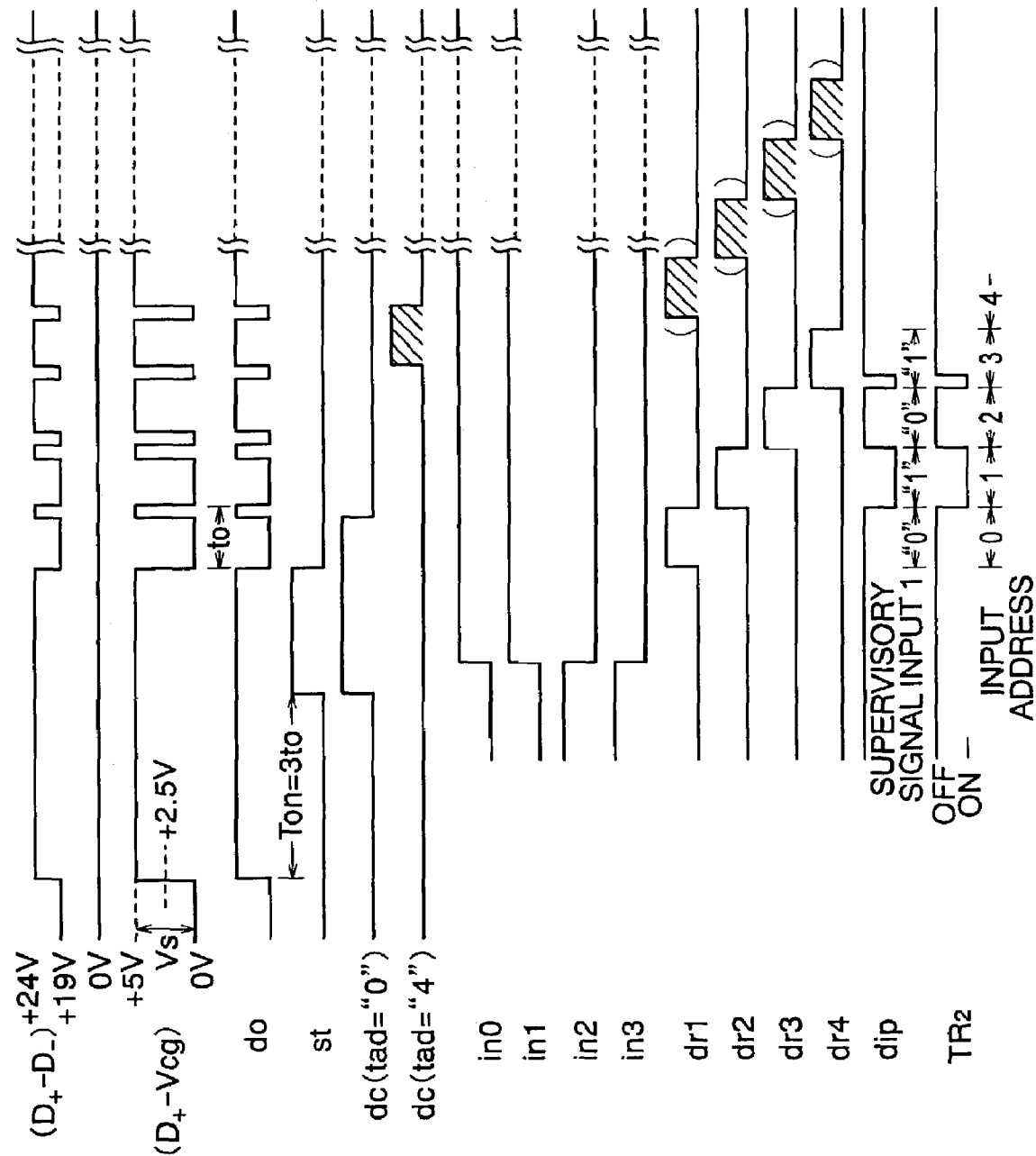
FIG. 10 shows charts of waveforms of signals in the child station input section shown in FIG. 9.

A specific arrangement and process starting from the output of a control signal from a controller 10 to the input of a supervisory signal to the controller 10 in this example will be described below with reference to FIGS. 5 to 10. FIG. 5 shows an exemplary configuration of a parent station 13. FIG. 6 shows charts of the waveforms of signals in the parent station 13 shown in FIG. 5. FIG. 7 shows an exemplary configuration of a child station output section 14. FIG. 8 shows charts of the waveforms of signals in the child station output section 14 of FIG. 7. FIG. 9 shows an exemplary configuration of a child station input section 15. FIG. 10 shows charts of the waveforms of signals in the child station input section 15 of FIG. 9. Bidirectional transmission waveforms in this example are as shown in FIG. 2.

A parent station output section 135 will be described first. In FIGS. 5 and 6, timing generating means 132 outputs a start signal ST, a predetermined number of clock CK signals, and an end signal END. The start signal ST is outputted (driven high) in response to a predetermined command (not shown) provided from the controller 10, for example. Similarly, the timing generating means 132 is disabled in response to the input from another, predetermined command (not shown) provided from the controller 10. In order to distinguish the start signal ST from the clock CK, the output duration of the start signal ST is set to 5t0, where t0 is one cycle of the clock CK. The frequency of an oscillation output from an oscillator 131 is divided to provide a clock CK of predetermined cycles. As indicated by chart of the output Dck, output of the clock CK is started subsequent to the start signal ST, in synchronization with the falling edge of the start signal ST. Then, a predetermined number of clock pulses (addresses) are outputted. For keeping the count, the timing generating means 132 includes counting means (not shown). The counting means start counting at the rising edge of the start signal ST. When the count output from the counting means reaches a predetermined value, the output of the clock CK is stopped. In succession to the detection of the predetermined number of clock CK pulses (addresses), the end signal END is outputted. For this purpose, the timing generating means 132 includes comparing means (not shown). The comparing means compares a count output from the counting means with an address set in the address setting means 133. If they match, the end signal END is output for a predetermined period of time. In order to distinguish the end signal END from the clock CK, the output duration of the end signal END is set to 1.5t0. The end signal END resets the counting means. In synchronization with the end of the output of the end signal END, output of the start signal ST is restarted and the same process that described above is repeated. The total number of data pieces transmitted in one transmission cycle (starting from a start signal ST to the subsequent end signal END) corresponds to the maximum address value, which is the address of the parent station 13. One piece of data is equivalent to one clock.

For example, if addresses (the number of data pieces in the control signal) are 0 through 31, control signals OUT0 through OUT31 (OUT0p through OUT31p), which are 32 bits of parallel data, are provided from an output unit 102 to an output data section 134. In this case the output data section 134 is formed by a 32-bit register with a trailing of the start signal ST as a trigger, which shifts the control signals OUT0 to OUT 31 in synchronization with a clock CK and outputs the resulting signals as outputs Dops, in that order. The addresses may be 0 to 63, 127, 255, . . . . Input of the control signals OUT0 through OUT 31 is restarted (updated) in synchronization with a start signal ST, for example. The maximum address (address 31) is set by the address setting means 133. This allows the end signal END to be provided onto a signal line Pck in synchronization with the completion of processing control signal data at address 31. As shown in FIG. 5, the address setting means 133 closes the first to fifth weighted switches from left to produce a high-level signal "111110" to set address 31 (this operation also applies to other addresses).

Output Dops is forced to high level (or "1") or low level ("0") according to the data value of control signals OUT0 through OUT 31 on a clock basis. In this way, a signal "0011. . . ", for example, is provided. Output Dops is inputted into the control data signal generating means 136. The start signal ST and end signal END are also inputted into the control data signal generating means 136.

The timing generating means 132 divides an oscillation output of the oscillator 131 to produce a clock 4CK having a frequency four times higher (4f0) than the frequency f0 of the clock CK. The control data signal generating means 136 uses a counter (not shown) to keep count of the clocks 4CK. If the value (signal Dops) of control signals OUT0 through OUT31 is "1," then it provides onto the first data signal line D+ a "high-potential low level" signal during the first one cycle of clock 4CK and a high-level Vx during the remaining three clocks of 4CK. On the other hand, if the value is "0," it provides the "high-potential low level" signal during the first three cycles of the clock 4CK and the high-level Vx signal during the remaining one cycle of the clock 4CK. In this way, the control data signal generating means 136 performs (PWM) modulation on the clock CK based on the control signals OUT0 through OUT 31.

The transmission line bleeder current circuit 1312 comprises transistors T1 and T2 and resistances R1 through R4 connected as shown in FIG. 5. The transmission line bleeder current circuit 1312 supplies a constant current Ip to the components in the parent station 13. The value of the constant current IP is set to 20 mA (milliamperes), for example, by setting the values of the resistors R1 through R4 appropriately. Supplying the constant current Ip in the parent station 13 in this way eliminates the need for connecting terminating resistances to the ends of each of the first and second data signal lines D+ and D− and prevents rounding of the transmission waveform due to stray capacitance on the data signal lines.

A power-supply voltage Vx=24V is supplied to the transmission line bleeder current circuit 1312 from an external source. The value of the external voltage may be at least the amplitude Vs (5V in this example). It may be a potential within the range between 12V and 24V.

An output from the control data signal generating means 136 is a binary signal (having a high level of 5V and a low level of 0V) and provided to a single signal line Pck. The signal provided onto the signal line Pck is provided to a line driver 137, then onto the first and second data signal lines D+ and D−. The line driver 137 is formed by a large transistor Td for supplying a charging current, which will be described later, and capable of low-impedance driving. The amplitude of an output of the line driver 137 is restricted by a Zener diode ZD1 (having a breakdown voltage of 4.5V) to a value within the range from 0V to 5V. The line driver 137 provides an inverted signal on the signal line Pck onto the second data signal line D−. The fist data line D+ is provided with the power-supply voltage Vx=24V. Thus, the signal between the first and second data signal lines D+ and D− is a binary signal (comprising the level Vx and "high-potential low level"). Between the first and second data signal lines D+ and D−, the start signal ST is provided as a signal at the power-supply voltage Vx and the end signal END is provided as the "high-potential low level" signal.

A child station output section 14 will be described below. In FIGS. 7 and 8, a signal on the first data signal line D+ is provided mainly to a line receiver 141. A power-supply-voltage generating means 140 is a DC(direct current)-DC converter, which uses known means to smooth and stabilize voltages on the fist and second data signal lines D+ and D− to provide a stable output Vcg (19V) and uses a diode D0 and a capacitor C0 to produce an output Vcp (24V). The cycle of a pulse-width-modulated on the first and second data signal lines D+ and D− is set so that the output Vcp can well maintain a voltage of 24V. The child station output section 14 (and the child station input section 15) operates at a voltage between the output Vcg (19V) and output Vcp.

The line receiver 141 comprises separate resistances R1 and R2 having the same resistance value and a buffer circuit B. The line receiver 141 detects a potential difference between the first and second data signal lines D+ and D−, more properly, a potential difference Vs between the high and low levels of the pulse voltage described above. The detected potential difference is divided by the separate resistances R1 and R2 into two signals, which is outputted through the buffer circuit B. That is, if the potential difference between the first and second data signal lines D+ and D− is 24V, the diode D0 is turned on by the potential of 24V on the first data signal line D+, the capacitor C0 is charged to the potential difference, output Vcp=24V is provided to one end of the resistance R1. The voltage of 24V is also provided to one end of the resistance R2. As a result, there is no potential difference between the resistances R1 and R2. On the other hand, if the potential difference changes to 19V, the diode D0 is turned off, and the potential of Vcp, which is based on the potential on the second data signal line D−, is maintained at 24V by the capacitor C0. On the other hand, the potential of 19V on the first data signal line D+, one end of the resistance R2, is provided. As a result a potential difference of 5V is provided between the resistances R1 and R2, which is divided into two, and the resulting value is input into the buffer circuit B. These potentials shift as a whole and the relationship between the output Vcp (24V), which is a reference potential, and output Vcg (19V) does not change.

As can be appreciated from the description above, the child station 11 is circuitry in which a capacitor C0 is provided across the first and second data signal lines D+ and D− and the diode D0 is provided between the terminal on D+ side of the capacitor C0 and the signal line D+. Accordingly, during a period in which the potential difference between the signal lines D+ and D− is equal to the power-supply potential Vx=24V, a charging current flows from the signal line D+ to the signal line D− through the diode D0, thereby charging the capacitor C0 and driving the circuits of the child station 11 and controlled device 12. On the other hand, during the period in which the potential difference is (Vx−Vs)=19V, the diode D0 is turned off and therefore no charging current for the capacitor C0 flows from the signal line D+ to the signal line D−. During the (Vx−Vs) period, the capacitor C0 discharges to drive the circuits of the child station 11 and controlled device 12 and, if a supervisory data signal provided is "1", for example, to superimpose a current signal on the signal, as will be described later. That is, a current Iis, which is equal to the value "1" of the supervisory data signal, is provided onto the signal line D−.

Given control signals out0 through out31 (serial pulse voltage signals) on which a clock CK is superimposed, the buffer circuit B outputs a high-level signal when the above-described potential difference is 24V, and otherwise outputs a low-level signal. This is signal "do," which is the data value of a demodulated control signal. This contains a phase-modulated clock CK. Signals, including the signal "do," that are produced based on outputs from the line receiver 141 are inputted into a preset forward counter 1432 and shift register 144. The waveform of the signal "do" is as shown in FIG. 8. This is equivalent to the waveform of a clock CK that is PWM-modulated based on the control signals out0 to out 31. The high-level value of the signal "do" is 5V.

Before the process described above, a start signal ST is also detected as the high level of the signal "do" and inputted into an on-delay timer Ton. The delay is set to 3t0. That is, the rising edge of an output st is delayed by 3t0 and the falling edge is synchronized with the original signal ST. The output "st" does not appear in an end signal END or clock CK because of their high-level period is short. The output "st" is provided to a differential circuit ∂, a differential signal is inputted into the preset forward counter 1432 and shift register (SR) 144 at the rising edge of output St and used as a reset signal R for resetting them. Signal "do" (and therefore an extracted clock CK) is also inputted into them.

An address, 0 to 3, (address 0 in the example shown in FIG. 7) assigned to its child station 14 is set in a setting section 1431 of child station address setting means 143. The preset forward counter 1432 of the child station address setting means 143 is reset by the differential signal at the rising edge of the output "st," then starts counting extracted clocks CK at its rising edge, and continue to continue to provide output "dc" while the count value matches an address set in the setting section 1431. That is, the signal is forced high in synchronization with the rising edge of the clock CK in the cycle of the previous address and forced low in synchronization with the rising edge of the clock CK in the cycle of the current address. The signal of address 0 is driven high in synchronization with the rising edge of the output "st," as shown in FIG. 8. For reference, the signal for address 4 is shown by shades in FIG. 8. It can be seen that the timing is shifted by one clock. Output "dc" is provided to the shift register 144.

On the other hand, a signal d1 is provided by an off-delay timer Toff to which the signal "do" is inputted. The off-delay timer Toff delays outputs only off (low-level) periods by a predetermined amount of time. That is, it delays the falling edge of the input "do" and synchronizes the rising edge with the original input "do." The delay time is set to ½t0. Thus, in the signal d1, when the data value of a control data signal is "1," the off period of "high-potential low-level" in the first ¼ cycle of the clock is too short to appear (the signal remains high). When the data value is "0," in the signal d1, the off period of the "high-potential low-level" in the first ¾ cycles of the clock is long enough to maintain that level. That is, the "high-potential low-level" appears in the signal d1 only in the (¾−½)=¼ cycle.

The shift register 144 shifts "1 (or a high level)" in synchronization with the rising edge of a clock CK extracted during a high-high level period of the output dc. That is, "1" is shifted in the unit circuits Sr1 through Sr4 of the shift register 144, in that order. Accordingly, outputs dr1 through dr4 of the shift register 144 sequentially are forced high in synchronization with arising edge of the clock CK and kept high in the clock CK cycle until the rising edge of the next cycle. The outputs dr1 through dr4 are provided as clocks to D flip-flop circuits FF1 through FF4, respectively.

Signal d1 (that is, the data value of a demodulated control signal) is inputted into the flip-flop circuits FF1 through FF4, which are an output data section 145. For example, the flip-flop circuit FF1 obtains and holds the value of signal d1 in synchronization with the rising edge of the output dr1, then outputs it. In this example, it outputs a low-level signal.

Other flip-flop circuits FF2 through FF4 similarly capture and hold the value of the signal of the signal d1 at the time to output it. Thus, data values "0011" of the control signal at addresses 0 through 3 are demodulated into signals out0 through out 3.

The signals out 0 through out 3 are inverted and then provided as outputs O0 through O3, respectively, to the controlled section 16 of the controlled device 12 through large driving transistors T0 through T3, whose emitters are connected to the capacitors C0, to control a load L0 and other loads. As described earlier, power supply is provided to the load L0 and others from the child station output section 14.

A child station input section 15 will be described below. As can be seen from comparison with FIGS. 4 and 7, the configuration of a part from power-supply voltage generating means 150 to address extracting means 154 in FIGS. 9 and 10 is almost the same as that of the part from the power-supply voltage generating means 140 to the address extracting means 144. Addresses assigned to the child station input section 15 are the same as those (that is, addresses 0 through 3, in this example) of the child station output section 14, for example. Pieces of supervisory signal data as many as (four) extracted pieces of control signal data are inputted.

An input data section 155 comprises the same number (four) of two-input AND gates as the number of the assigned addresses, 0 through 3, and an OR gate which receives outputs from the AND gates. Inputted into the four AND gates are outputs dr1 through dr4 from a shift register 154, which is address extracting means 154, as shown in FIG. 9. The outputs dr1 through dr4 are sequentially driven high in synchronization with a falling edge of the clock CK and kept high in the clock CK cycle (until the falling edge of the next cycle), as describe earlier. Consequently, each of the four AND gates opens during the high-level periods of the outputs dr1 through dr4 and supervisory signals in0 through in3 (signals based on the input of signal "0" or "1," which depends on the state of a sensor section 17 such as a switch SW0) are outputted in that order from an OR gate through the AND gates. The supervisory signals in0 through in3 correspond to the control signals out0 through out 3 in FIG. 7.

The output from the OR gate is inputted into a two-input NAND gate 1562. Also inputted into the NAND gate 1562 is an output from an inverter INV, that is an inverted signal of the signal "do." The NAND gate 1562 constitutes supervisory signal generating means 156. The supervisory signals in0 through in3 take values "0101," as shown in FIG. 10, during high-level periods of the outputs dr1 through dr4, for example. Consequently, during the periods in which the supervisory signals in0 through in3 are outputted, the NAND gate 1562 opens in synchronization with the rising edge of the signal "do" and the supervisory signals in0 through in3, which take values "0101," are outputted as an output "dip."

The output "dip" undergoes level conversion through a line driver 157 and then is provided to the first and second signal lines D+ and D−. The line driver 157 comprises transistors T1 and T2, a diode D, and resistances R3, R4, and Ris. The output "dip" is inputted into the large transistor T2 through the transistor T1. That is, if a supervisory signal is "1," the output "dip" becomes low to turn on the transistor T2, thereby causing a current Iis, which is a supervisory signal, to flow through the first and second data signal lines D+ and D−. This superimposes the current signal Iis, which is value "1" of the supervisory signal, on the signal line D−.

The transistor T2 appropriately selects any of the resistances R3, R4, and Ris to limit the current flowing through it. For example, the current is limited to 30 mA (milliampere).

As appreciated from the description above, the supervisory signal is provided from child station input section 15 (superimposed) onto the first and second data signal lines D+ and D– in one (extracted) clock "do" cycle. As described earlier, during a period in which the potential difference between the first and second data signal lines D+ and D– is (Vx–Vs)=19V, the diode D0 is turned off and a charging current, which otherwise flow of the charging current for the capacitor C0 from the signal line D+ to the signal line D– does not flow. Therefore, no collision between a charging current and a supervisory signal from the parent station 13 occurs.

A parent station input section 139 will be described below. Returning to FIGS. 5 and 6, the first supervisory signals provided onto the first and second data signal lines D+ and D– are inputted in supervisory signal detecting means 1311, where it is detected. The detected signal is inverted and outputted as a signal Diip. The signal Diip takes on a waveform that contains the supervisory signal (alone). In the signal Diip, supervisory data corresponding to the address position of supervisory signal data is in an address position one address position behind the address position of the control signal data.

The parent station input section 139 comprises a transistor T3, which is a current detection circuit that detects changes in a current on the first and second data signal lines D+ and D– and outputs a result, and Zener diodes ZD1 and ZD2, and resistances R5, R6, and R7 as the supervisory signal detecting means 1311. The Zener diode ZD1 having a breakdown voltage of 4.5V and the resistance R5 limit the amplitude of the signal to 5V=Vs. The transistor T3 detects a current Is shown in FIG. 5. That is, in a period during which the potential difference between the signal lines D+ and D– is (Vx–Vs)=19V, a charging current, which otherwise flows of the charging current for the capacitor C0 from signal line D+ to the signal line D– does not flow as described above, but the detected current Is flows to the supervisory signal detecting means 1311. If at this point the supervisory signal is "1," the supervisory signal has a current Iis superimposed on it. Thus, a current of (constant current Ip=20 mA)+ (current Iis=30 mA)=50 mA flows as the supervisory signal detection current Is. The Zener diode ZD2 breaks down at a current of 35 mA or higher. This is the threshold Ith for detecting the current Is. Therefore, the detection current Is=50 mA provided by the supervisory data signal "1" causes the transistor T3 to be turned on. When the supervisory data signal is "0," the supervisory signal does not have the current Iis superimposed on it. Therefore, the constant current Ip (=20 mA) flows as the supervisory signal detection current Is. Therefore, the Zener diode ZD2 does not break down and the supervisory data signal "0" causes the transistor T3 to be turned off.

The detection current Is (=50 mA), which is the supervisory data signal "1," is converted into a voltage signal in response to a voltage drop in a corrector resistance R7, and inputted in supervisory signal extracting means 1310. A signal Diip is formed by an inverter INV based on the detection current Is and inputted into an RS flip-flop FF of the supervisory data extracting means 1310. A clock signal Dick, which is delayed one cycle from the clock CK, is inputted into the RS flip-flop FF as its clock from timing generating means 132. Accordingly, a signal Diis outputted from the flip-flop FF provides the value of the supervisory signal alone within timing of one cycle after the original clock CK and during a period equal to ¼ cycle or ¾ cycles of the clock CK. The signal Diis is inputted in an input data section 138.

The input data section 138, which comprises a 32-bit register, receives an inputted signal Diis in a predetermined bit, holds it until a new data value is inputted, and then outputs it. For this purpose, the signal Dick, which is the clock delayed one cycle from the clock CK, is inputted into the input data section 138. This causes a signal Diis is taken into the register of the input data section 138 in the next cycle of the original clock CK. Eventually, supervisory signals IN0 through IN31 (IN0i through IN31i), which are 32-bit parallel data at addresses 0 through 31, serial-parallel-converted, are inputted into an input unit 101 from the input data section 138. Thus, the supervisory signals are inputted as "0101 . . . ," for example.

The present invention has been described with respect to its embodiment, variations may be contemplated within the spirit of the present invention.

Figure 11:
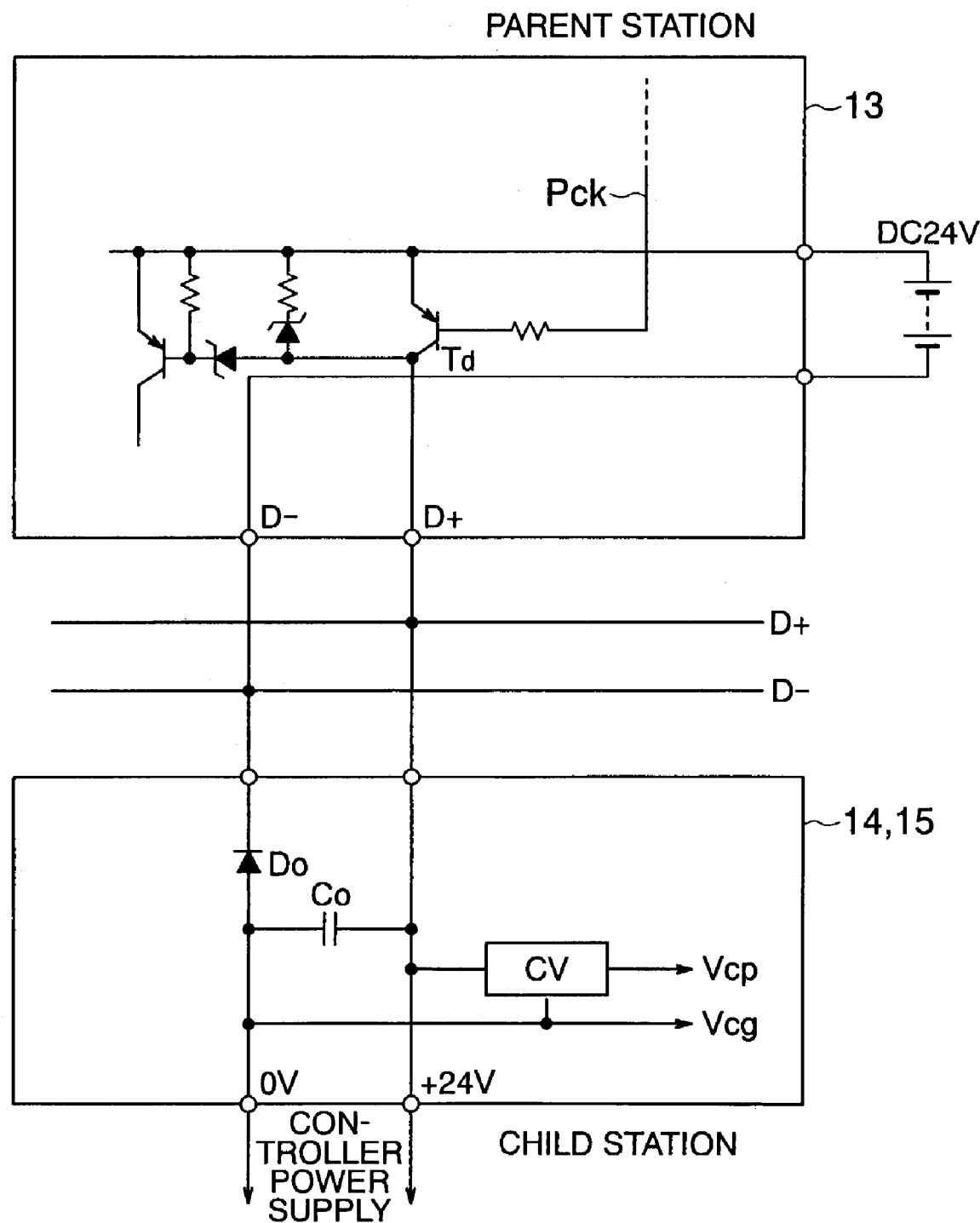
FIG. 11 shows another basic configuration according to the present invention.

For example, the configuration of the line driver 137 in the parent station 13 may be changed as shown in FIG. 11. FIG. 11 shows only a portion of the parent station 13. In FIG. 11, a transistor Td which forms the line driver 137 is changed into a pnp transistor from a npn one, instead of than a npn transistor used in the embodiment described above. In addition, the polarity of the connection in the child station 11 (the child station output section 14 and the child station input section) 15) is also changed as shown in FIG. 11. This configuration also provides the same advantages as those of the embodiment described above.

Figure 12:
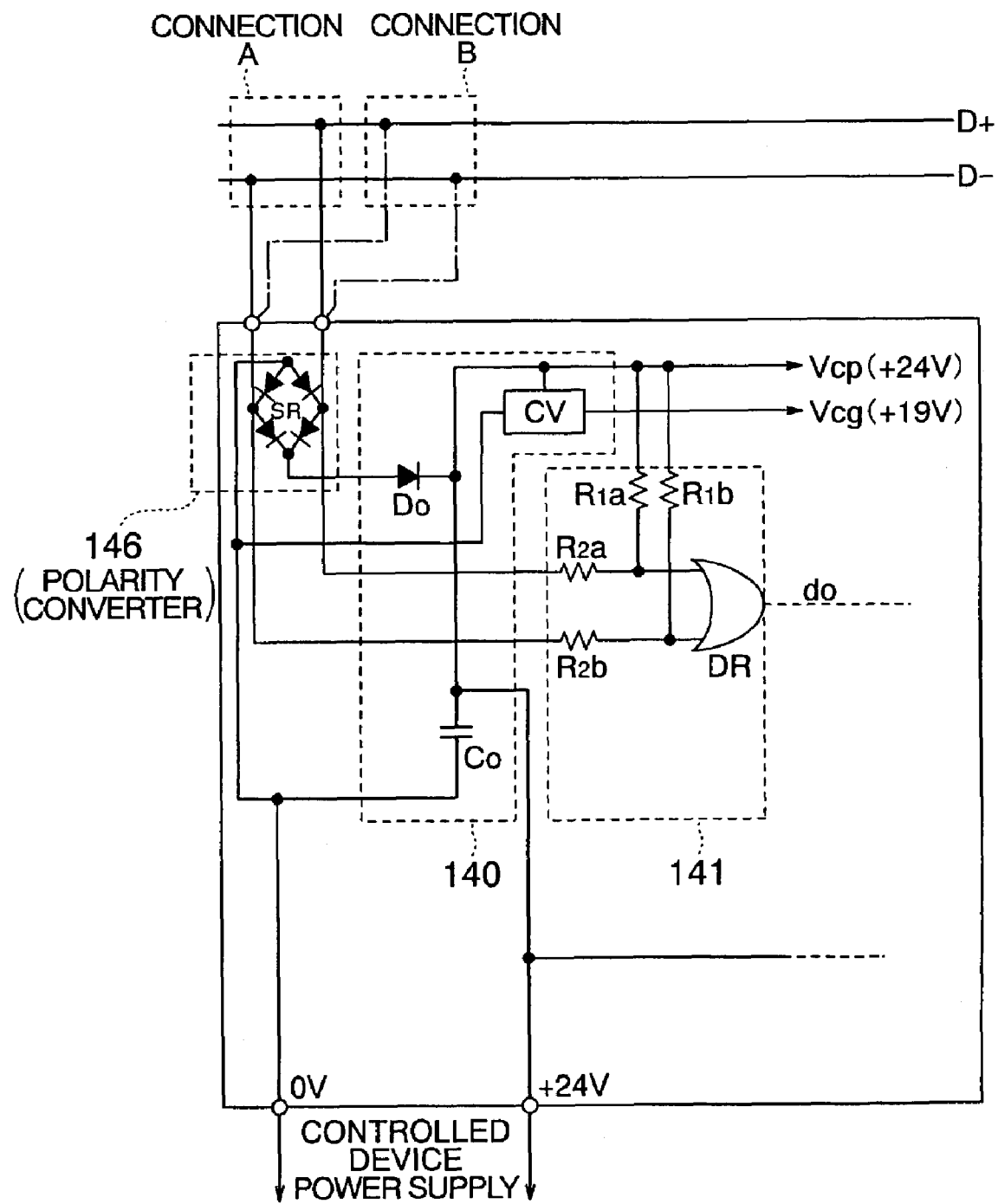
FIG. 12 shows another basic configuration according to the present invention.

The configuration of a child station output section 14 may be changed as shown in FIG. 12. FIG. 12 shows only a portion of the child station 14. In FIG. 12 the correct connections to the data signal lines are connection A indicated by solid lines. If they are improperly connected as shown in connection B indicated by a dashed line due to a human error, the child station output section 14 can be electrically broken or become inoperable. As insurance against this, a polarity converter 146 is provided in the child station output section 14. A full-wave rectifier SR in the polarity converter 146 converts a signal inputted through connection B into a signal equivalent to a signal inputted through connection A. This can protect the child station output section 14 and ensure proper operations of the child station output section 14 in the case the lines are improperly connected like connection B.

This can be applied to the child station input section 15 as well as the output section 14. While only the child station output section 14 is shown in FIG. 12, a similar polarity converter may also be provided in the child station input section 15.

A line receiver 141 may be configured as shown in FIG. 12. That is, the two input terminals of a two-input OR gate circuit are connected to the first and second data lines D+ and D–. This allows a control signal to be detected, whichever of connections A and B is used to connect to the data lines.

While in the embodiments described above, one (one-channel) control signal and one supervisory signal is superimposed on a clock including a power supply voltage, two control signals and one supervisory signal may be superimposed. That is, a multiplexed (duplexed) control signal and a (non-multiplexed) supervisory signal are provided onto a common data line and transmitted simultaneously in both directions. Alternatively, two control signals and two supervisory signals may be superimposed. That is multiplexed (duplexed) control signal and a multiplexed (duplexed)

signal are provided onto a common data signal line and transmitted simultaneously in both directions.

Furthermore, an error check circuit may be provided in the parent station 13. The error check circuit monitors the first data signal line D+ to check the conditions of the line (for failure such as a short circuit). The configuration of the error check circuit may be as one disclosed in Japanese Patent Application Serial No. Hei1(1989)-140826, for example.

As described in Japanese Patent Application Serial No. Hei1(1989)-140826, a plurality of parent station output sections 135 and parent station input sections 139 may be provided and associated with specific child stations. In that case, m (m≧1) parent station output sections 135 and m child station output sections 14 are provided, associated with each other in a one-to-one relationship, connected to a data signal line in a predetermined sequence. On the other hand, N (n≧1) parent station input sections 139 and n child station input sections 15 are provide, associated with each other in a one-to-one relationship, and connected to the data signal line in a predetermined sequence. The associated pairs are sequentially operated under the control of a timing signal to transmit control data to associated controlled sections 16 and a supervisory signal from sensor sections 17. Furthermore, a plurality of groups stations configured as described above may be provided. The number of stations may differ from group to group.

Furthermore, CPUs (Central Processing Unit) (not shown) provided in the parent station and child stations may executes programs for performing processes described above to implement operations in a parent station 13 and child stations 11.

In a control and supervisory signal transmission system according to the present invention, a two-value (a power-supply-voltage level and a "high-potential low-level) control signal having a predetermined duty factor is used and a supervisory signal is detected as the presence or absence of a current signal. This allows the control signal and supervisory signal to be superimposed on a clock signal and power lines to be eliminated. Thus, high-speed bidirectional signal transmission can be achieved, the control signal and supervisory signal can be provided onto common data signal lines and transmitted simultaneously and bidirectionally. In addition, sufficient power can be supplied to child stations without using power lines. As a result, the need for providing separate periods for transmitting separately the control signal and supervisory signal over the common data signal lines can be eliminated, thereby increasing signal transmission speed. In addition, the average power transmittable can be increased to eliminate power lines and increase the length of the common data signal lines, thereby allowing the control signal to be transmitted to and the supervisory signal to be obtained from, small wiring areas in a controlled device.

What is claimed is:

1. A control and supervisory signal transmission system comprising:
    a controller;
    a plurality of controlled devices, each of the controlled device having a controlled section and a sensor section for monitoring the controlled section;
    a parent station connected to the controller and a data signal line common to the plurality of controlled devices; and
    a plurality of child stations associated with the plurality of controlled devices and connected to the data signal line and the associated controlled devices,
    wherein a control signal from the controller is transmitted to the controlled section and a supervisory signal from the sensor section is transmitted to the controller through a data signal line,
    wherein the parent station further comprises:
    timing generating means for generating a predetermined timing signal that synchronizes with a clock having a predetermined cycle;
    a parent station output section that changes a duty factor between a period in which the control data signal is at a non-power-supply-voltage level that is lower than a power supply voltage and higher than high-level signals in other circuit portions and a subsequent period in which the control signal is at the power supply voltage in accordance with each data value in the control signal inputted from the controller in each cycle of the clock under the control of the timing signal to convert the control data signal into a serial pulse voltage signal and output the serial pulse voltage signal onto the data signal line; and
    a parent station input section for detecting a supervisory data signal superimposed on the serial pulse voltage signal transmitted through the data signal line in each cycle of the clock under the control of the timing signal to extract each data value from the serial supervisory signal, convert the extracted signal into the supervisory signal, and input the supervisory signal into the controller, and
    wherein each of the plurality of child stations further comprises:
    a child station output section for identifying the duty factor between a period in which the control signal is at a level different from the power supply voltage of the serial pulse voltage signal and a subsequent period in which the control signal is at the power-supply-voltage level in each cycle of the clock under the control of the timing signal to extract value values from the control data signal and provide data in the data values that is relevant to the child station to the controlled section; and
    a child station input section for producing a supervisory data signal in accordance with the value in the associated sensor section under the control of the timing signal and superimposing the supervisory data signal at a predetermined position of the serial pulse voltage signal.

2. A control and supervisory signal transmission system according to claim 1,
    wherein the supervisory data signal comprises different two current value levels, and
    wherein the parent station input section detects the supervisory data signal as a current signal to extract each data value from the supervisory signal.

3. A control and supervisory signal transmission system according to claim 1, wherein the parent station output section sends a charging current to the child station output section and child station input section through the data signal line.

4. A control and supervisory signal transmission system according to claim 1, wherein the data signal line further comprises a first and second data signal lines, the second data signal line being at the lowest and reference potential, the first data signal line being at either the non-power-supply-voltage level or the power-supply-voltage level that is the highest potential level.

5. A control and supervisory signal transmission system according to claim 1, wherein the data signal line further comprises a first and second data signal lines, the first data signal line being at the highest and reference potential, the second data signal line being at either the non-power-supply-voltage level or the power-supply-voltage level that is the lowest potential.

6. A control and supervisory signal transmission system according to claim 1, wherein each of the child station output section and child station input section converts a signal obtained from the data signal line irrespectively of the polarity of connection to the data signal line.

7. A control and supervisory signal transmission system according to claim 3, wherein the child station output section and child station input section blocks the charging current flowing through the data signal line during the non-power-supply-voltage level period.

8. A control and supervisory signal transmission system according to claim 3, wherein the child station output section and child station input section comprises charging means charged with the charging current, and block the charging current flowing through the data signal line and discharge the charging means during the non-power-supply-voltage level period.

9. A control and supervisory signal transmission system according to claim 7, wherein the child station input section outputs the supervisory data signal while blocking the charging current flowing through the data signal line during the non-power-supply-voltage-level period.

10. A control and supervisory signal transmission system according to claim 9, wherein the supervisory data signal comprises a current signal indicating the presence or absence of a current, and wherein the parent station input section detects a level that is the sum of a bleeder current flowing through the data signal line and a current of a current signal that is the supervisory data signal during the non-power-supply-voltage-level period to detect the supervisory signal.

11. A control and supervisory signal transmission system according to claim 6, wherein each of the child station output section and child station input section is connected to each of the data signal lines to obtain and output a signal transmitted through the data signal line and calculate a logical OR of the outputs.

* * * * *